(No Model.)

A. EUSTON.
CIRCULAR SAWING MACHINE.

No. 254,202.  Patented Feb. 28, 1882.

WITNESSES:
A. S. Fitch
A. G. N. Vermilye

INVENTOR
Alexander Euston
BY J. S. Fitch
ATTORNEY

UNITED STATES PATENT OFFICE.

ALEXANDER EUSTON, OF ST. LOUIS, MISSOURI.

CIRCULAR SAWING MACHINE.

SPECIFICATION forming part of Letters Patent No. 254,202, dated February 28, 1882.

Application filed December 16, 1881. (No model.)

*To all whom it may concern:*

Be it known that I, ALEXANDER EUSTON, of St. Louis, county of St. Louis, State of Missouri, have invented an Improved Sawing-Machine, of which the following is a full, clear, and exact description, reference being had to the accompanying drawings, forming part of this specification.

My invention relates to a sawing-machine, and more particularly to such a machine intended for use in cutting and squaring the edges of oil-cakes and other objects; and my invention consists in the combination of devices hereinafter particularly described, and arranged to co operate as specified.

Figure 1:
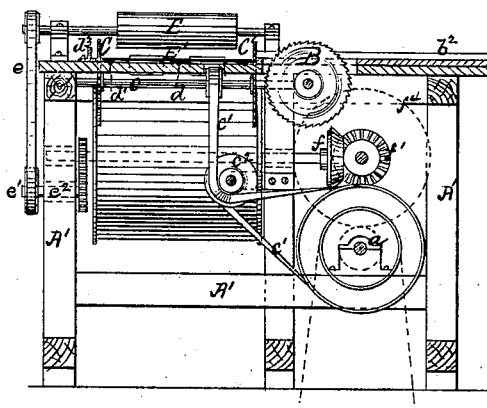
Figure 2:
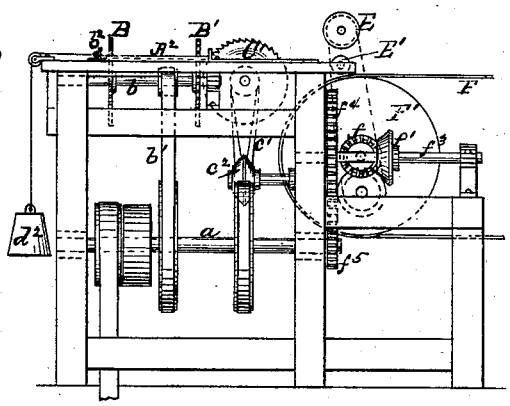
Figure 3:
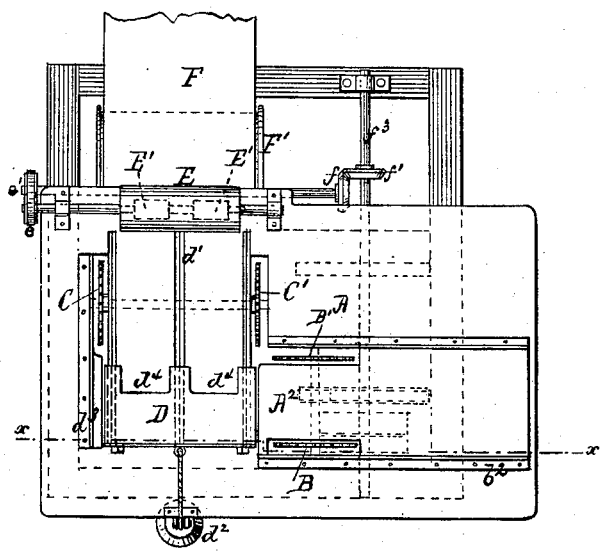

Figure 1 is a vertical section on the line $xx$, Fig. 3, of a sawing-machine containing my invention. Fig. 2 is a side elevation, and Fig. 3 is a plan, of the same.

A is the table of the machine, on suitable supports, A'.

B B' and C C' are two pairs of circular saws, on arbors $b$ and $c$, respectively, and working in the usual slots in the table. These respective pairs of saws are placed and arranged to run at right angles to each other, as shown in Fig. 3, and the pair C C' is placed in the table beyond the line of cut of the pair B B', as shown. Both pairs are driven from the same power-shaft, $a$. The pair B B', being on an arbor parallel to said shaft, is driven in the usual way by a belt, $b'$. The pair C C', on the arbor at right angles to the power-shaft, is driven by belt $c'$, working on the double cone-pulley $c^2$, running on a stud-journal fixed on the frame, as shown. On the table, and leading to and extending alongside of the saws B B', is arranged a guide-bar, $b^2$, as shown. This guide may be adjustable on the table.

D is a platform, mounted on slides $d$, which work in grooves or ways $d'$ on the table, and so arranged on its ways that it may be caused to traverse the table in the direction of the cut of the saws C C' and to pass between said saws, as seen in Fig. 3. The part $A^2$ of the table between the saws B B' is elevated somewhat above the plane of the top of the platform D, and the edge of this part $A^2$ is carried out between the saws B B', so as to be closely adjacent to the side of the platform, as shown, whereby the stuff to be cut will, on being pushed to and beyond the saws B B', pass readily on to the platform D. The platform is provided with a counter-weight, $d^2$, as shown, by which means the platform is pulled back on its ways to the position opposite to the part $A^2$ of the table after said platform has been caused to traverse the table between the saws C C', and is released by the workman. At one side of the platform, and opposite to the surface $A^2$ of the table A, is arranged the guide $d^3$, which may be adjustable, and which leads to and alongside of the saws C C'.

At E is a live feed-roller, working in bearings on the table, and arranged, as shown, above the line of the upper face of the platform D, and across the table a little forward of the line of the limit of the travel of said platform, as seen in Fig. 3. In line under this roller E is arranged the roller E' (which may be a dead-roller) in suitable bearings, the face of which roller extends upward above the line of the plane of the surface of the platform D. The platform is recessed at $d^4$ on its rearward edge to permit it to reach the limit of its travel on its ways and pass over the line of roller E'.

At F is a traveling belt or apron, which passes over the drum F', which has its bearings so arranged in the frame relatively to the table that the face of the belt F will run just under the table at the line of the limit of the travel of the platform D, as seen plainly in Fig. 2; and the belt F is placed so that it runs away from the rear edge of the table in the line of the travel of said platform D.

The drum-shaft is driven by a bevel-gear, $f$, which engages a similar gear, $f'$, on the counter-shaft $f^3$, which in turn is driven by a gear, $f^4$, engaging a pinion, $f^5$, on the power-shaft $a$.

A belt, $e$, from a pulley, $e'$, on a small counter-shaft, $e^2$, which is driven by gears from the drum-shaft, drives the roller E.

The operation of my machine is as follows: The oil-cake or other object having irregularly-shaped edges, and which it is desired to cut and square the edges of, is placed upon the table with one edge against the guide $b^2$, and is then pushed by the workman at this end of the table on to the saws B B', which trim and cut two opposite edges, so that they are parallel to each other. As the object escapes from the saws B B' it passes easily on to the platform D, which is ready to receive it, and one of its remaining irregular edges abuts against the guide $d^3$. The platform carrying the object is then pushed by the second workman, who stands at this side of the table, along its ways between the saws C C′, and the said saws cut and trim the said remaining irregular edges into lines parallel with each other. As the platform reaches the limit of its travel between the saws C C′ it runs on to the roller E′, projecting up through the recesses in the rear edge of the platform, and the object on the platform thus passes between the rollers E E′, and is griped between them and drawn by them off of the platform and delivered to and upon the belt F, by which the objects thus trimmed and squared are delivered at any convenient place.

It is evident that two workmen placed at the table as heretofore indicated and working in unison will be enabled to handle, trim, and deliver upon the belt F a succession of oil-cakes or other objects with great ease, facility, and rapidity. And, furthermore, the various parts of the machine being all driven by the same power-shaft, it is evident that the starting, stopping, and rate of motion of the various parts may be readily and conveniently effected and controlled.

What I claim as my invention, and desire to secure by Letters Patent, is—

1. In a sawing-machine, the combination of table A, pairs of saws B B′ and C C′, said pairs being located in the table at right angles to each other, as described, and being driven by same shaft, $a$, guides $b^2$ and $d^3$, and traveling platform D, arranged to work between saws C C′, provided with counter-weight $d^2$, and when at rest to be adjacent to the part $A^2$ of the table, said part $A^2$ being between the saws B B′ and elevated above the plane of platform D, all constructed and arranged to operate as and for the purpose specified.

2. In a sawing-machine, the combination of table A, pairs of saws B B′ and C C′, said pairs being located in the table at right angles to each other, as described, guides $b^3$ and $d^3$, platform D, traveling on ways between saws C C′, counterweighted at $d^2$ and recessed at $d^4$, rollers E E′, and belt or apron F on drum F′, said saws, rollers, and belt being all driven by same shaft, $a$, in the machine-frame, all constructed and arranged to operate as and for the purpose specified.

ALEXANDER EUSTON.

Witnesses:
C. W. BLOW,
THOMAS RICHESEN.